Feb. 23, 1932. F. W. HOCHSTETTER 1,846,055
SOUND TRANSLATING APPARATUS
Filed March 19, 1929
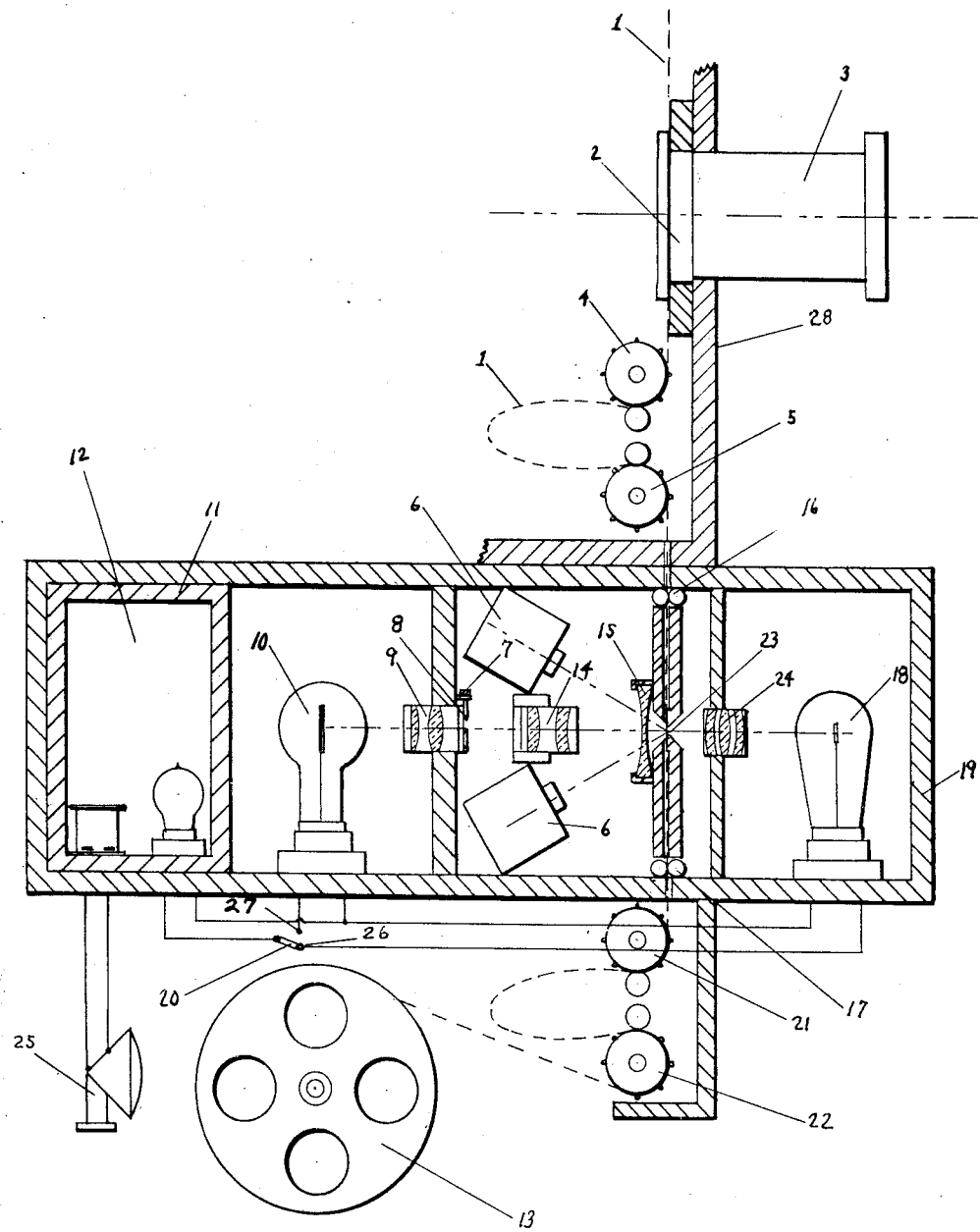
INVENTOR
Frederick W. Hochstetter
by F. N. Barber
attorney Patented Feb. 23, 1932

1,846,055

UNITED STATES PATENT OFFICE

FREDERICK W. HOCHSTETTER, OF PITTSBURGH, PENNSYLVANIA

SOUND TRANSLATING APPARATUS

Application filed March 19, 1929. Serial No. 348,197.

This invention relates to a combination apparatus for projecting light through transparent or translucent mediums, having sound frequency images recorded thereon and/or projecting from an illuminated surface of a medium having visible sound frequency images thereon, together with means for converting the projected sound frequency images into electrical wave frequencies and translating the electrical frequencies into the original sounds recorded on the medium.

The art of projecting light through transparent mediums, having sound frequency images thereon and the subsequent steps for audibly translating the frequency images into original sounds, is well known, so that there is no need for a detailed description thereof. The art of projecting sound frequency images by reflected light from an opaque surface is known, but no one has succeeded in carrying out a method or process for successfully translating the sound frequency images into original sounds. Various schemes have been suggested but apparently none are practical and none are in commercial use.

It is well known that, by transmitting and projecting images from an opaque surface by reflected and optically transmitted light, a certain percentage of illumination is lost. To meet the required efficiency for translating sound with the same source of illumination as is used for projection by transmitted light, I provide a plurality of light-sensitive elements or photo-cells differing in characteristics and sensitivity from each other. For example, when my apparatus is used for transmitting and translating sound by light transmitted through a transparent or translucent medium a less sensitive cell may be used in comparison with the cell used for transmitting and translating sound by optical reflection from an opaque surface. I have found by experimenting that a photo-cell such as a selenium cell, is sufficient for use with transmitted light projection, and that a more sensitive photo-cell such as potassium photo-cell is required for translating by optical reflection. Both cells may be set in separate circuits or in a single electrical circuit with means to switch in or off from one cell to the other depending on the medium used and in accordance with predetermined requirements.

No one, to my knowledge, has ever produced or disclosed a convertible apparatus for use in the arts of recording and producing sound photographically and/or photo-electrically, nor has anyone disclosed the translating of sound from a substantially opaque medium in accordance with this specification. No one has disclosed the translating of sound frequency images into electrical frequencies by the use of a translucent positive photographic medium by transmitted light, the rays of light being projected through the medium and onto the translating means. By translucent mediums, I mean the finished positive photographic record having sound frequency wave images thereon, the images being translucent instead of transparent as in standard practice. No one ever disclosed the use of a photographic medium for the purposes described, produced on a textile base, such as canvas, cloth, silk fabric or paper.

By the use of my invention I have succeeded in transmitting light optically and focusing the rays of such light onto the medium. I transmit the necessary lumens for illuminating the surfaces thereof, so as to efficiently project photo-optically from an opaque medium or through a translucent or transparent medium. I transmit from the medium, the images and convert the same into light waves and onto suitable translating apparatus, converting the light sound frequencies into varied electrical frequencies and translating the latter into the original sounds without distortion.

Another object of this invention is to provide an apparatus which may be used to receive and transmit sound frequency images from and through transparent or translucent mediums and which may be converted so as to receive and transmit sound frequency wave images from an illuminated surface of a substantially opaque medium.

Another object of this invention is to provide a convertible sound frequency image receiving and transmitting apparatus of simple design and construction for use in connection with any suitable known methods and apparatus for projecting motion pictures with synchronized sounds or for other useful purposes.

A further object of this invention is to provide projection and translating apparatus for use in connection with motion picture machines using either transparent or opaque mediums and, in connection with all the various required means, to provide an apparatus which can carry out its functions without the necessity of skilled operators. The motion picture apparatus of my U. S. Patents Nos. 1,372,619 and 1,372,621, may be used in conjunction with translucent, transparent or opaque mediums.

A further object of this invention is to assemble the necessary means for projecting and converting sound frequency images into varied electrical frequencies without pictures or motion pictures, preferably into one combination sound-proof container or housing, the whole being adapted for use in conjunction with any suitable projection machine and in accordance with the standard practice of projecting motion pictures synchronously with musical or other sounds.

Another object of this invention is to so provide combined means for reproducing talking motion pictures, for translating sound frequency images by either light transmission or optical reflection methods and audibly amplifying the same.

Another important object of this invention is the elimination of fire hazard by the use of non-inflammable mediums, such as silks, papers, fabrics and the like. Satisfactory results may be produced by using any suitable medium, but I prefer fabric mediums, preferably the mediums described in my copending applications, Serial Numbers 302,427, filed Aug. 27, 1928, 308,341, Sept. 25, 1928, or 342,884, Oct. 30, 1929. Such mediums are cheaper and more durable than the celluloid medium commonly used.

Another important and economical object of this invention is to produce an apparatus for the purposes specified at a low cost.

The main object of this invention is to provide a convertible optical apparatus for receiving and transmitting sound frequency images projected through a finished photographic positive medium or for photo-optically receiving and transmitting sound frequency images from a substantially opaque finished photographic medium having positive sound frequency images thereon, the sound frequency images in either case to be received and converted into electrical frequencies and the latter to be translated and audibly amplified into the original sounds.

In carrying out this invention I provide optical means for illuminating and transmitting light onto the surface of a medium having sound frequency wave images thereon. I provide further optical means for picking up the sound frequency wave images from an illuminated surface of a medium and focusing and transmitting the photo-optically picked-up sound wave frequency images onto a receiving lens, the receiving lens having preferably an adjustable slot to permit the passage of the focused projected images through the said lens which further focuses the images onto a light-sensitive element or photo-cell. The said photo-cell is arranged in a suitable electrical current, which converts the projected sound frequency wave images into electrical frequencies in accordance with the variation of the light. I transmit the electrical frequencies into several amplifying stages which translate the frequencies into original sounds. The lens having adjustable slots or light regulating means may be used in accordance with my issued Patents Nos. 1,364,278 and 1,301,264.

Referring to the accompanying drawing, the view is a vertical section of one form of my invention, parts being shown conventionally and diagrammatically.

On the drawing, 1 designates an opaque, transparent or translucent meduim on which there are motion picture images and sound wave images. The medium, if opaque, may have both kinds of images on one surface or one kind of images may be on one surface and the other kind on the other surface. The medium may be transparent or translucent, or the sound wave images may be on an opaque portion of the medium and the motion picture images on a transparent or translucent portion thereof.

The medium is fed past the gate 2 and the motion picture tube 3 by the intermittently-operated sprocket 4 in the usual manner by means well known and therefore not shown. The medium is looped between the sprocket 4 and the sprocket 5 which feeds the medium continuously. The medium thence passes between the guide rollers 16 across the exposure window or slit 23 and between the guide rollers 17. From the latter a medium is fed by the continuously moving sprockets 21 and 22 to the take-up roller 13, the medium being looped between the sprockets 21 and 22.

As the motion picture images pass the guide 2 they are projected onto a suitable screen, not shown. In case the pictures are on an opaque medium, they will be projected by light reflected from the surface of the medium. In case the medium is transparent or not too densely translucent, the pictures may be projected in the usual way by light transmitted through the medium.

The particular portions of the sound wave images passing the window 23 at any instant are in synchronism with the particular pictures projected at the same instant from the gate 2, so that the sounds emitted from the apparatus will correspond accurately to the movements displayed by the pictures.

As the sound wave images are recorded on transparent or translucent portions of the medium the switch 20 is placed on the contact 26. Light from the lamp houses 6 is concentrated by the lens 15 upon the sound track on the medium exposed at the window or slit 23, the lens being preferably heat-absorbing as well as light concentrating. The sound frequency wave images on the medium are transmitted through the medium and thence to the light sensitive element or photo-cell 18 by which the varied light frequencies are translated into electrical frequencies, the latter being detected and amplified by any suitable apparatus indicated by the numeral 12. This apparatus is shown only in part and without the necessary tubes and wiring since the complete apparatus for this purpose is well known and forms no part of the present invention. 11 is a shield for the amplifier and 25 designates a loud speaker for the audible reproduction of the original sounds. The speaker may be of any type and connected in any suitable manner to the amplifying apparatus and at any reasonable distance from the apparatus.

If the sound wave images are on an opaque medium, the lens 15 is removed and the switch 20 is placed on the contact 27. Light from the lamp houses 6 impinges upon the medium at the window 23 and is picked up by a suitable photographic lens combination 14 which focuses the light upon the slit 8 whose width is made adjustable by the screw 7. From the slit 8 sound images are transmitted through the lens combination 9 and into the photo-cell 10, which is connected by the switch 20 to the amplifying apparatus 12 which functions with respect to the electrical frequencies transmitted from the photo-cell 10 precisely the same as when the electrical frequencies are received from the photo-cell 18.

19 designates my invention as a whole and forming an attachment for a standard motion picture machine shown only in part and designated by the numeral 28.

I claim:—

1. In a convertible sound translating apparatus for use in connection with the standard practice of projecting motion pictures and sound images through transparent mediums and/or for use in connection with projection apparatus using opaque mediums from which the images are projected optically, the said apparatus containing a plurality of apertures past which the mediums are fed, a plurality of optical means for transmitting light to the mediums, a plurality of lenses, a plurality of light sensitive elements differing in characteristics from each other and connected in a single electrical circuit, and means to switch in one light sensitive element when sound translation is accomplished by transmitted light and to switch in the second light sensitive element for sound translation from an opaque medium, for the purposes specified.

2. In a sound translating apparatus for use in connection with either transparent or opaque mediums, two light sensitive elements, means to transmit light through an aperture and through a transparent medium and into one light sensitive element, means for making either element inoperative, and means to project sound wave images from the surface of an opaque medium to the second light sensitive element, the light sensitive element for converting sound frequency images into electrical frequencies through a transparent medium being less sensitive than the light sensitive element used to receive the sound frequency images picked-up from the surface of an opaque medium.

3. In an apparatus for transmitting light frequency images from either a transparent or an opaque medium, a plurality of light sensitive elements, means whereby one element receives images transmitted through a transparent medium, and means whereby the other element receives images picked-up from the surface of the opaque medium, the light sensitive element used for converting light frequency images into electrical frequencies from and through a transparent medium being less sensitive to light than the light sensitive element used for translating sound frequency images into electrical frequencies picked-up from the surface of an opaque medium.

4. In an apparatus of the class described, a window, a mechanical means to transmit past the window photographic mediums bearing sound records, a light-emitting source, means for optically transmitting light from the said source to the window, a light-sensitive element at each side of the window, one element positioned to receive images of the records transmitted by the light projected through the medium and the window and the other element positioned to receive images of the records reflected from the mediums, and optical means between the window and the light-sensitive elements to pick up the images and transmit them to the light-sensitive elements.

5. In an apparatus of the class described, an exposure window past which mediums bearing sound frequency wave images are fed, a source of light arranged to direct light to the window and to mediums moving past the window, a light-sensitive element arranged on one side of the window to receive images transmitted by light passing through the mediums, a light-sensitive element on the opposite side of the window to receive images picked up by light reflected from the mediums and a lens means for picking up the reflected light and directing it into the latter light-sensitive element.

6. In an apparatus of the class described, an exposure window past which mediums bearing records are fed, a source of light arranged to direct light to the window and to mediums moving past the window, a light-sensitive element arranged on one side of the window to receive images transmitted by light passing through the mediums, and a second light-sensitive element on the opposite side of the window to receive images picked up by light reflected from the mediums.

7. In an apparatus of the class described, a window, a mechanical means to transmit past the window photographic mediums bearing sound records, a light-emitting source, means for optically transmitting light from the said source to the window, a light-sensitive element at each side of the window, one element positioned to receive images of the records transmitted by the light projected through the medium and the window and the other element positioned to receive images of the records reflected from the mediums, optical means between the window and the light-sensitive elements to pick up the images and transmit them to the light-sensitive elements, a common amplifier and speaker for the light-sensitive elements, and switching means for associating the amplifier and the speaker with either light-sensitive element.

In testimony whereof, I hereunto affix my signature.

FREDERICK W. HOCHSTETTER.